United States Patent [19]

Foster et al.

[11] Patent Number: 5,186,337

[45] Date of Patent: Feb. 16, 1993

[54] PIVOTED POWER COLUMN

[75] Inventors: L. Dale Foster, Brookville, Ind.; Timothy A. Kappers, Cincinnati, Ohio

[73] Assignee: Hill-Rom Company, Inc., Batesville, Ind.

[21] Appl. No.: 743,215

[22] Filed: Aug. 9, 1991

[51] Int. Cl.[5] .............................................. A47F 7/00
[52] U.S. Cl. ........................................ 211/26; 211/168; 248/131; 174/48
[58] Field of Search ............... 248/131, 145, 289.1; 211/190, 168, 26; 128/205.26, 897; 600/22, 21; 5/658, 503.1; 137/561 A; 361/334; 174/48

[56] References Cited

U.S. PATENT DOCUMENTS

| | | |
|---|---|---|
| 2,694,439 | 11/1954 | Murray . |
| 3,627,250 | 12/1971 | Pegrum . |
| 4,338,485 | 7/1982 | Fullenkamp et al. ......... 361/334 X |
| 4,345,847 | 8/1982 | Schiff et al. . |
| 4,500,134 | 2/1985 | Kaneko et al. . |
| 4,574,963 | 3/1986 | Fullenkamp et al. ............ 211/190 |
| 4,607,897 | 8/1986 | Schwartz . |
| 4,714,222 | 12/1987 | Kiesel et al. . |
| 4,783,036 | 11/1988 | Vossoughi . |
| 4,795,122 | 1/1989 | Petre . |

FOREIGN PATENT DOCUMENTS 1534200 11/1978 United Kingdom .

OTHER PUBLICATIONS

Kreuzer INCAREport . . . the focus is on the patient (11 pages) Friedhelm Kreuzer GmbH.
Drager, "The Ideal Intensive Care Unit" ICU 9000: Dragerwerk AG Lubeck, Fed. Republic of Germay (5 sheets).

Primary Examiner—Blair M. Johnson
Attorney, Agent, or Firm—Wood, Herron & Evans

[57] ABSTRACT

A power column is a hollow post having six vertical walls and is mounted between horizontal arm pivoted to the floor and ceiling, respectively. The pivotal axis for the arms passes through the head end of a hospital bed, enabling the power column to swing from one side of the bed to the other. The electrical outlets are on two walls separated by a front wall so that one or the other of the walls is easily accessible whether the power column is on either side of the bed. Lateral horizontal rails are pivotably mounted on either side of the column. The height of the rails is adjustable. The rails contain one or more gas outlets which are laterally adjustable on the rail and can carry other accessories that are laterally adjustable.

11 Claims, 8 Drawing Sheets

PIVOTED POWER COLUMN

BACKGROUND OF THE INVENTION

This invention relates to a power column, and more particularly, the invention relates to a pivotable power column of the type described in copending application Ser. No. 07/525,044, filed May 18, 1990.

A power column generally is disclosed in U.S. Pat. No. 4,523,683 and is fixedly mounted between floor and ceiling of a hospital room. The column is of rectangular cross section. A bed is positioned with its head end adjacent to the power column and with the bed being positioned at the angle with respect to the power column that is most convenient for the attending nurse and for providing physiological services for the patient. The power column has mounted in its front face plural gas outlets, that is, outlets for oxygen, purified air, nitrous oxide and vacuum. Alongside walls of the power column are electrical outlets. There is provision for normal 110 volt power, emergency power, low voltage communication circuits and low voltage monitoring circuits. A monitor with visual display is mounted on an arm at the front wall of the power column, the arm permitting the monitor to tilt and swivel. Vertical mounting rails are provided to mount a wide variety of accessories such as a sphygmomanometer, drainage bag, IV pole, stat clock timer for code blue situations, lamps, storage baskets, etc.

The power column is for critical care patients. The objective has been to make all of the equipment associated with the treatment of the patient as accessible as possible while providing as much freedom of movement as possible around the bed so as to permit the nurse to attend the patient, even in code situations.

Application Ser. No. 07/525,044 describes an improvement, particularly in the mounting of the power column for pivoting movement around the head end of the bed. More specifically, there are disclosed support arms pivoted to the floor and ceiling, respectively, on an axis that passes through the head end of the bed. The power column is mounted between the free ends of those arms, thereby permitting the power column to be swung to either corner at the head end of the bed so as to be positionable on either the right or left side of the bed. The pivoting power column increases the flexibility of bringing services to the patient on the side of the patient where they are needed or, alternatively, making the equipment optimally accessible to the nurse, with the nurse having the choice of having the equipment on her left or her right hand. The pivoting power column also frees space at the head end of the bed for procedures requiring the nurse to access the patient from the head end of the bed.

BRIEF SUMMARY OF THE INVENTION

It has been an objective of the present invention to provide a power column that improves upon the power column of the copending application Ser. No. 07/525,044 and to provide a power column providing optimal access to the patient with equipment that is more easily reached by the nurse, the power column having greater flexibility in positioning and moving equipment to meet specific needs of the patient.

The objective of the invention is attained by providing a power column having two substantially identical electrical outlet walls lying in planes that are about 90° to each other and preferably separated by a front wall. The power column is enclosed by parallel side walls and a back wall so that preferably it is six-sided in cross section.

The pair of electrical outlet walls that are at right angles to each other permit the power column to present, to the attending nurse, an outlet wall that is perpendicular to the side of the bed regardless of the side of the bed to which the power column has been pivoted. Thus, the electrical outlets are optimally accessible.

The power column is provided with a pole on each side of the power column. The pole contains a rotatable vertical rail. Laterally projecting, horizontal gas rails can be mounted in any vertical position on either vertical rail so that the gas rails are thus vertically adjustable and pivotable toward or away from the attending nurse. Accessories such as drainage bags or vaporizer bottles can be mounted on the gas rails. More importantly, one or more of four gas outlets can be mounted on each gas rail. The outlets are horizontally positionable for optimum access.

The rear wall of the power column preferably has seven horizontal rows of hook-up outlets. The top three and bottom three rows are preferably oxygen, purified air and vacuum, respectively, and the middle row is a nitrous oxide.

Within the column are two vertical, hollow extrusions mounted on the opposing side walls. Each hollow extrusion has two passageways, thus providing a total of four passageways for the four gases. Each extrusion has a vertical rib with bores angled through the rib to respective tubes, thereby providing vertically-spaced and alternating ports for the two gases supplied through the extrusion. Each port is connected to a horizontal tube having the four hook-up outlets that project through the back wall of the column. Flexible hoses connect the hook-up ports to the gas outlets that can be snap-fitted on horizontal gas rails generally of the type disclosed in U.S. Pat. No. 4,646,211 which is incorporated herein by reference.

Within the power column are four raceways for any combination of four electrical circuits, for example: normal 110 volts, emergency power, communication low voltage, and monitoring low voltage.

Each side wall has two vertical channels suitable for mounting various types of accessories using mounting of the type disclosed in U.S. Pat. No. 4,523,683 which is incorporated herein by reference.

A further feature of the invention resides in the provision of a monitor mounting arm and monitor combination providing a variety of monitor movements: vertical tilting through about 12" to raise and lower the monitor; swiveling about its own axis; swinging on the arm through about 220°; tilting on its own axis through an arc of up to about 15°.

The combined effects of the structural features of the invention greatly improve the accessibility and flexibility of the pivoting power column. The electrical outlets are more accessible. The gas outlets are not only more accessible, but are adjustable vertically, laterally and pivotally. The monitor is more completely adjustable with respect to the power column. These features obtain even if the power column is fixed. However, when coupled with the power column's ability to swing through about 120° around the end of the bed, the combination enables the nurse to put the monitor in the most desirable position. The cross section of the power column is, per se, small, being approximately 11×13 ½" in its preferred form. This is significantly smaller than the fixed power column of U.S. Pat. No. 4,523,683 and thus permits greater access to the patient around the head end of the bed.

BRIEF DESCRIPTION OF THE DRAWINGS

The several features of the invention will become more readily apparent from the following detailed description taken in conjunction with the accompanying drawings in which.

DETAILED DESCRIPTION OF THE INVENTION

Figure 1:
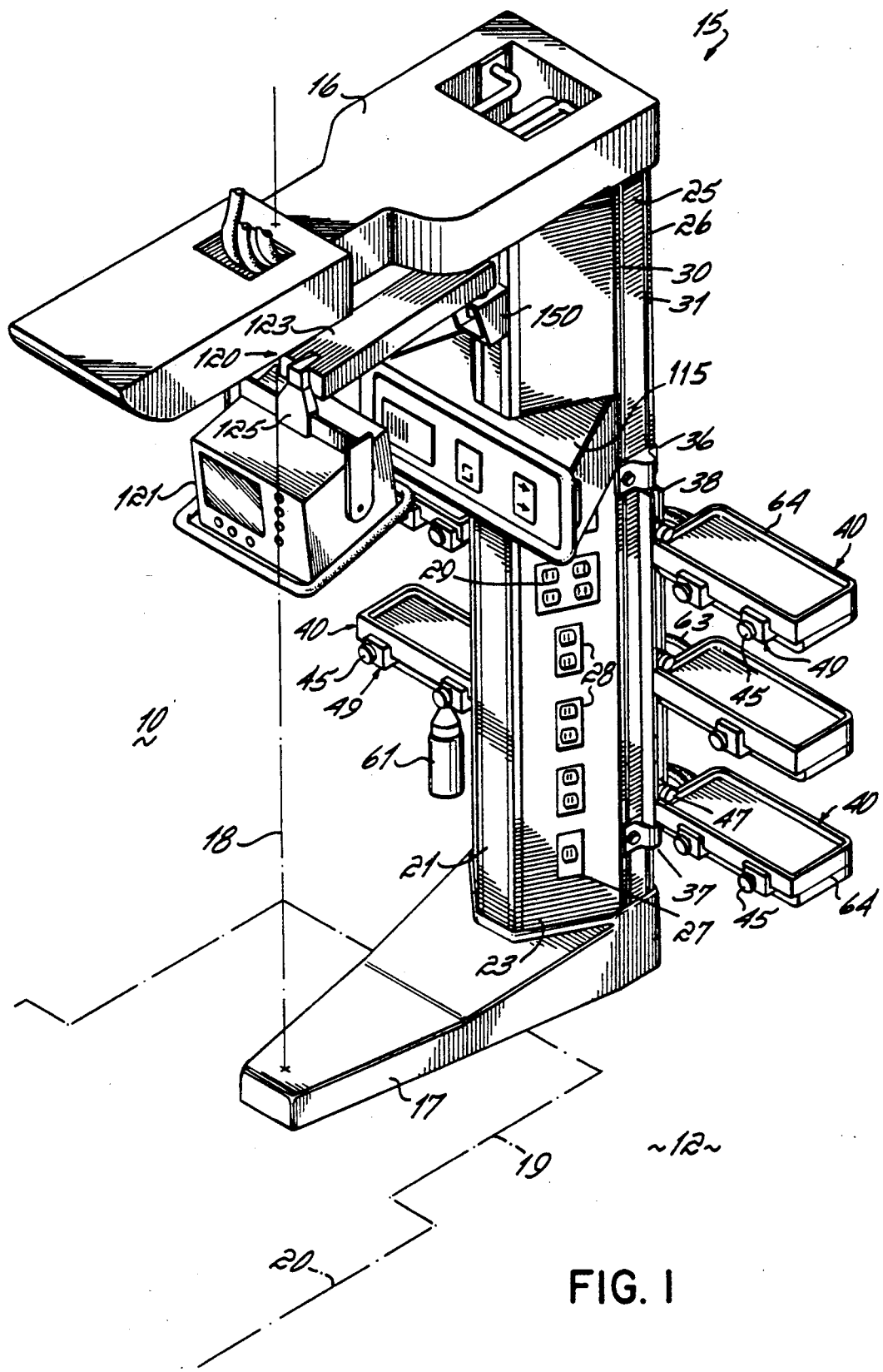
FIG. 1 is a perspective view of the invention.
Figure 3:
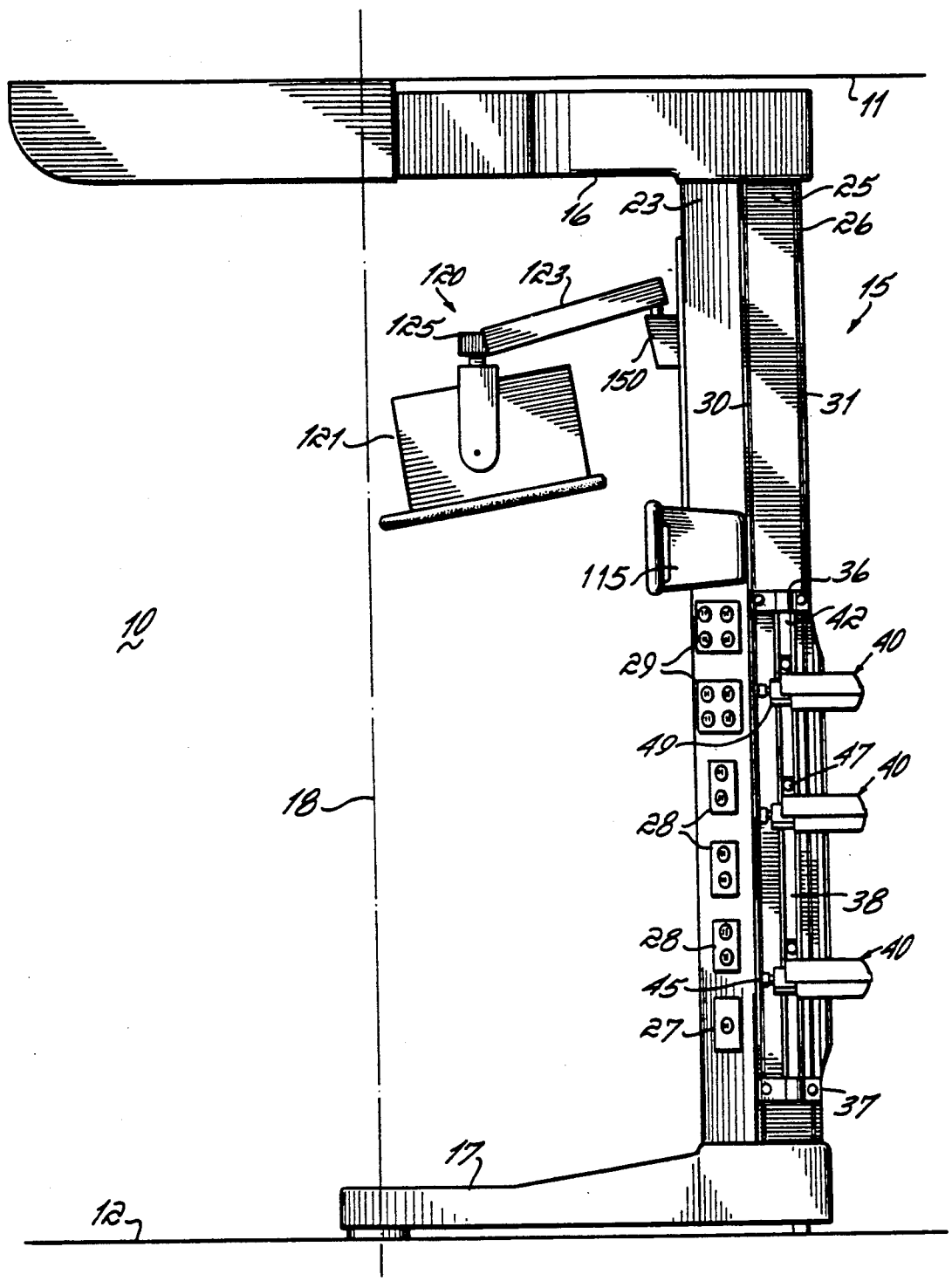
FIG. 3 is a side elevational view of the invention.

Referring to FIG. 1, there is shown a hospital room 10 having a ceiling 11 (FIG. 3) and a floor 12. A power column 15 in accordance with the present invention is mounted between an upper arm 16 and a lower arm 17. The upper arm 16 is pivotably mounted to the ceiling 11 and the lower arm 17 is pivotably mounted on the floor 12. A single pivotal axis 18 for the arms passes through the head end 19 of a bed 20 shown in outline form in FIG. 1.

Figure 2:
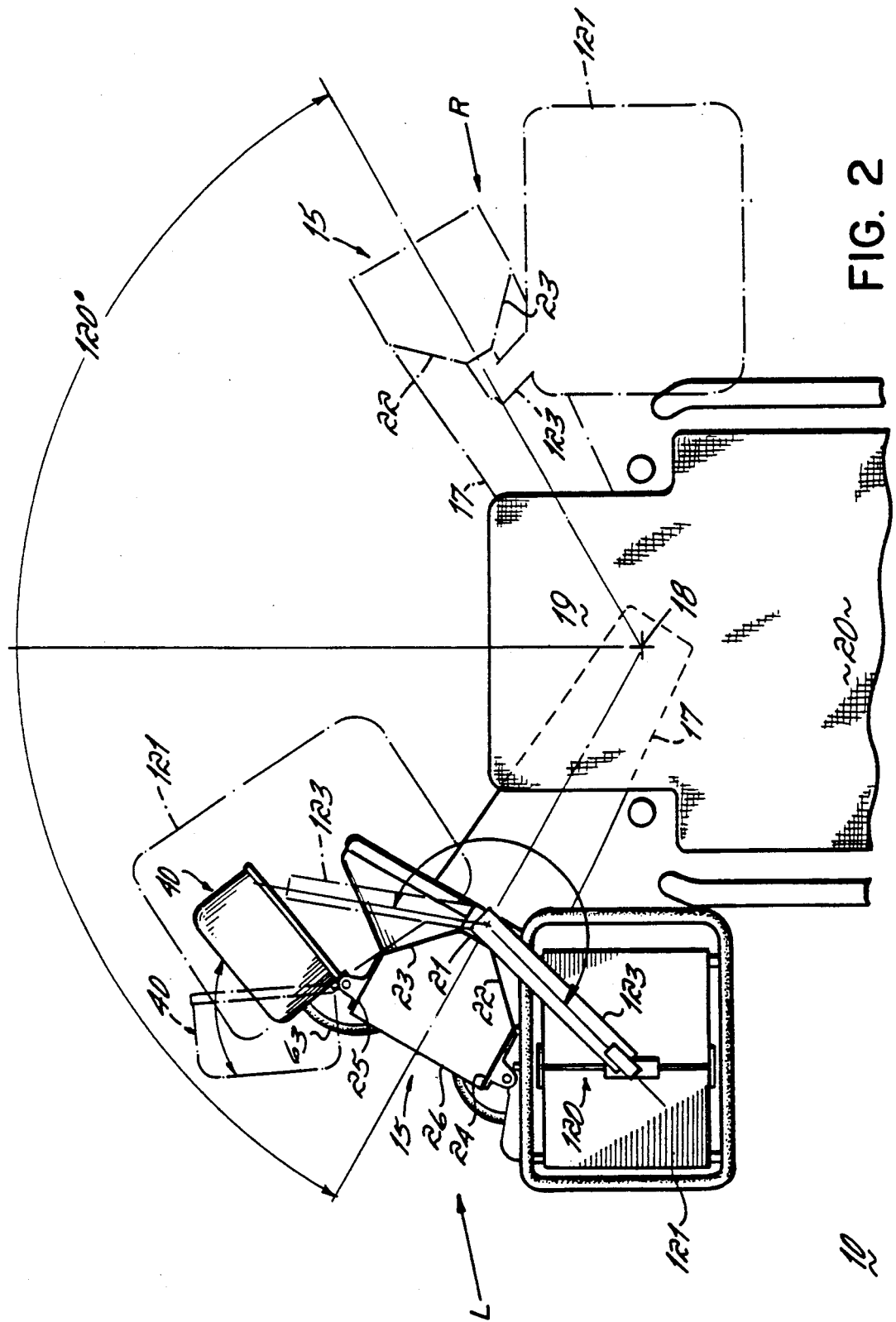
FIG. 2 is a diagrammatic plan view of the outline of the invention in conjunction with a hospital bed.

As best shown in FIG. 2, the power column 15 can be swung through an arc of about 120° so that in one position R at the right side of the bed the power column is at the right corner of the bed, and in alternate position L, the power column is at the left side of the bed. The power column can be at any place in between the positions R and L, but it is believed that the positions R and L are the most desirable from the standpoint of accessibility of the equipment to the nurse.

Figure 4:
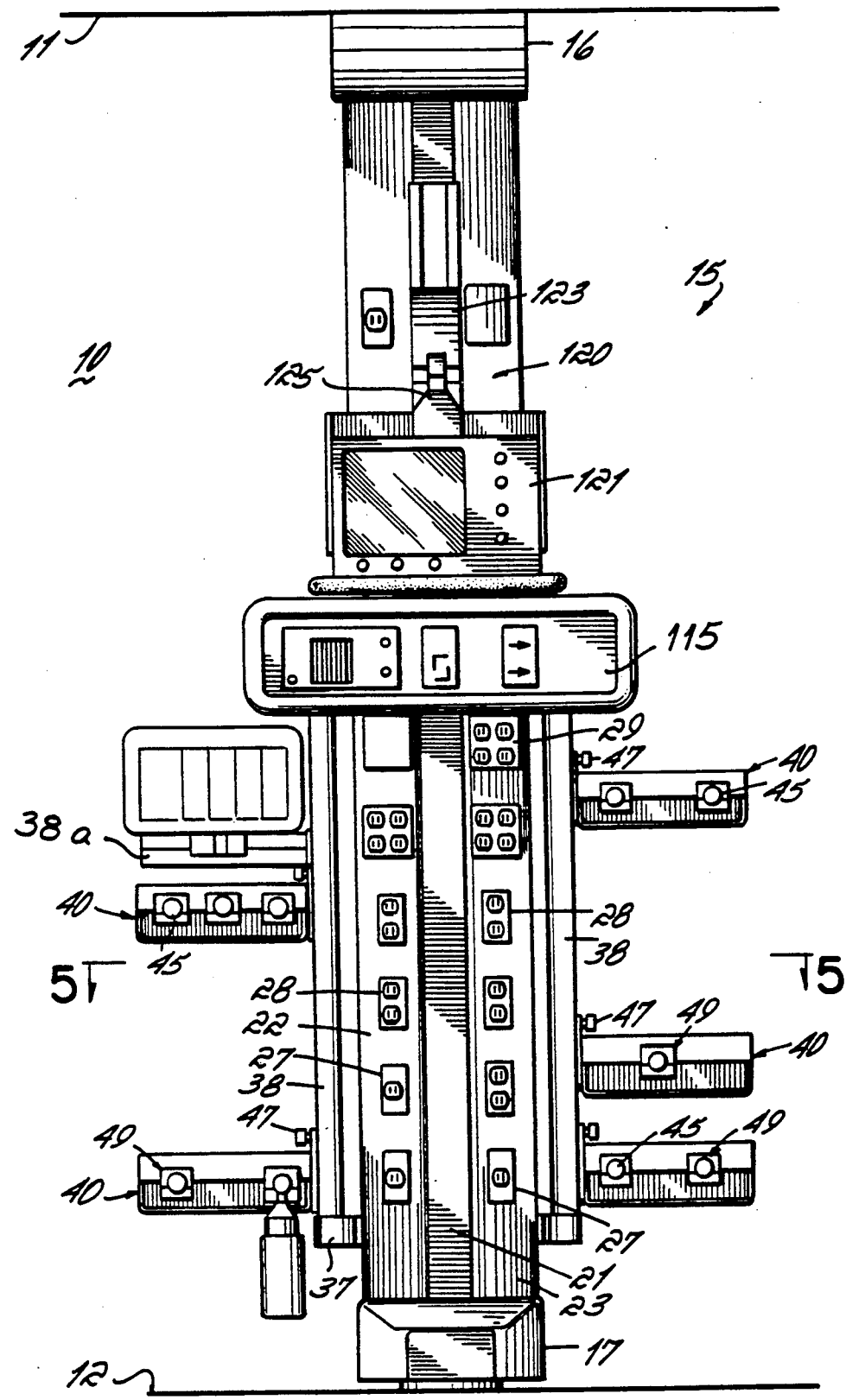
FIG. 4 is a front elevational view of the invention.
Figure 5:
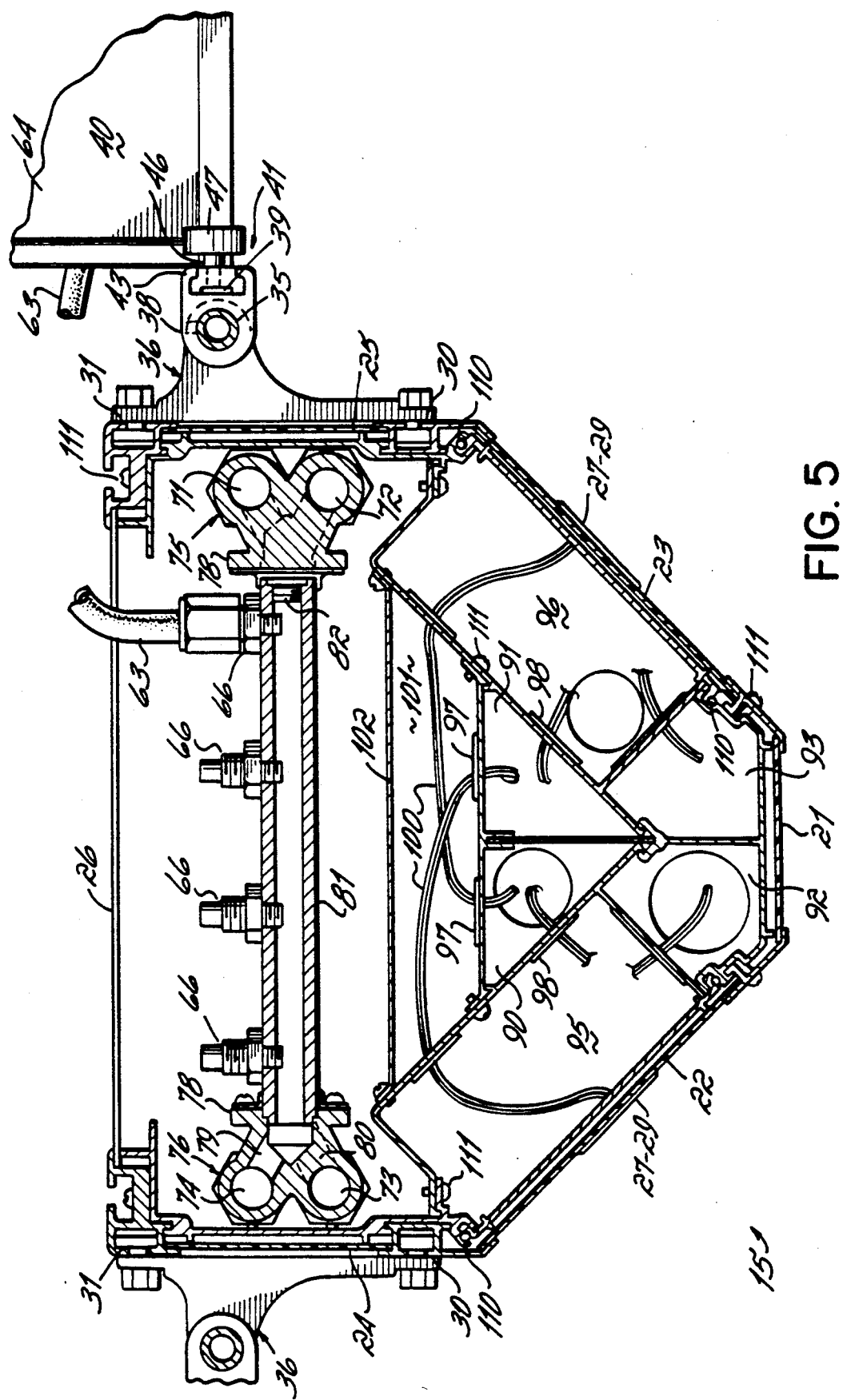
FIG. 5 is a cross-sectional view of the power column taken along lines 5—5 of FIG. 4.

As shown in FIGS. 2 and 5, the power column preferably has six walls. A front wall 21 is connected to two electrical outlet walls 22 and 23. The outlet walls 22 and 23 are each angled at about 45° to the front wall and 90° to each other. Opposed parallel side walls 24, 25 are connected to the outlet walls. A back wall 26 encloses the power column. As shown in FIGS. 1 and 4, the outlet walls 22 and 23 have a plurality of electrical outlets or receptacles mounted on the walls. These are simplex outlets 27, duplex outlets 28 or two-gang duplex outlets 29. By referring to FIG. 2, it can be seen that when the power column is in the R position, the outlets on the wall 23 are easily accessible to the nurse with the wall being approximately perpendicular to the side of the bed. When the power column 15 is in the L position, the outlets on the wall 22 are accessible with the wall 22 being approximately perpendicular to the side of the bed. The connections to the outlets, principally normal power and emergency power, are substantially duplicated on each wall.

Figure 6:
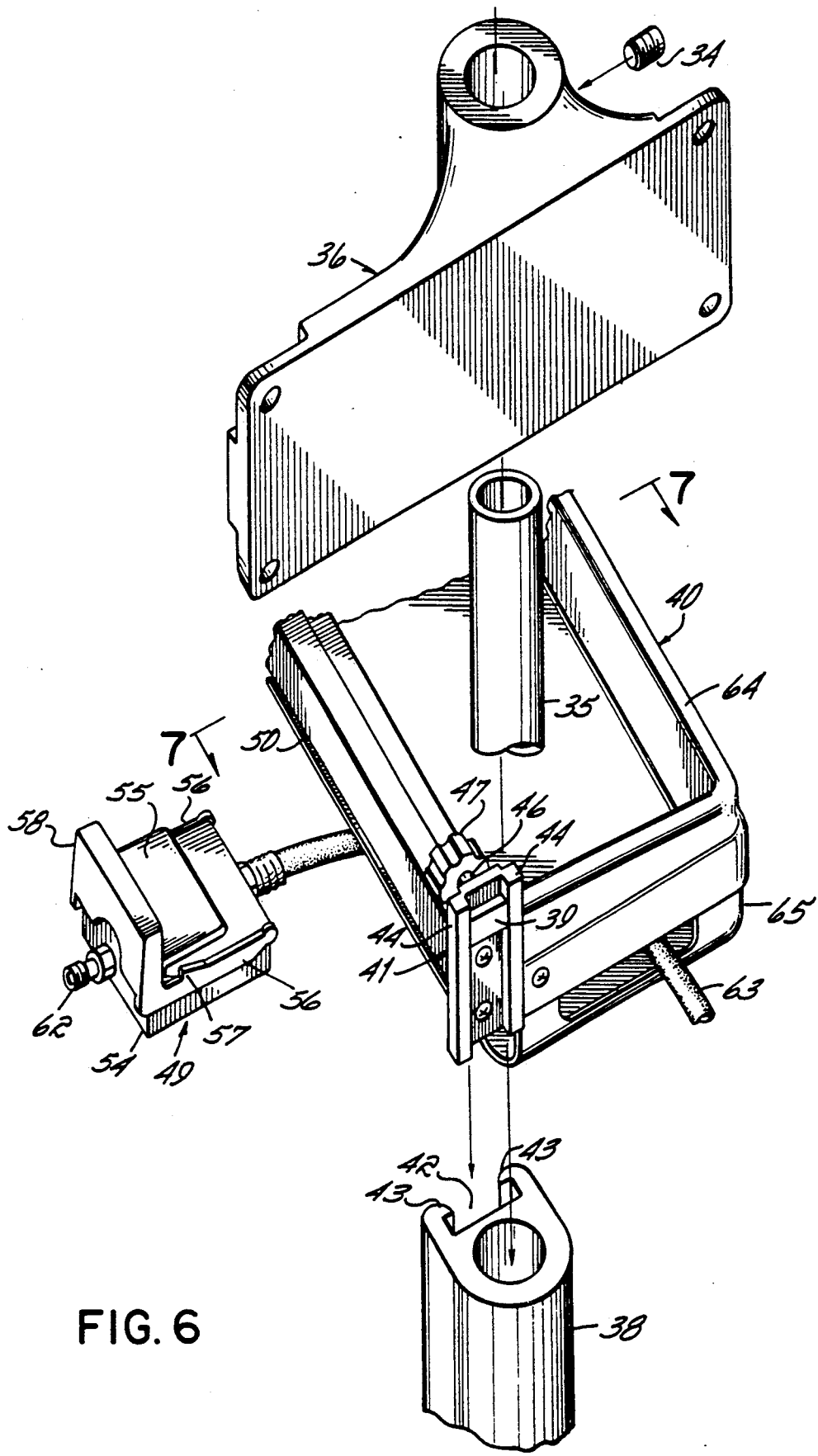
FIG. 6 is a disassembled perspective view of the gas rail mount of the present invention.

As best shown in FIGS. 1, 5, and 6, each side wall 24, 25 has a vertical front rail 30 and a vertical rear rail 31. The rails are employed principally for the mounting of accessories and gas outlets 45. A vertical pole 35 is mounted by upper and lower fixtures 36 to the vertical rails 30 and 31 on each side of the power column. Each pole 35 is fixed by a set screw 34 in its fixtures 36. Each pole 35 has a vertical rail 38 which is rotatable around the pole 35. A plurality of horizontal gas rails 40 are fixed to the vertical rail 38 on the pole 35 by means of a releasable fixture 41. Accessory rails 38(a) for other equipment can be mounted on vertical rail 38.

The rotatable rail 38 has a channel 42 defined in part by spaced apart lips 43. The fixture 41 has two spaced flanges 44 which underlie the lips 43 when the fixture 41 is slid into the channel 42. A clamping block 39 is mounted on a screw 46 threaded into the fixture 41. A knob 47 fixed to this screw 46 permits the screw 46 to be rotated in the fixture 41 to cause the clamping block 39 to be pressed against the bottom of the channel 42 in order to fix the fixture 41 and the accessory that it carries in any selected vertical position on the rail 38. Each fixture 41 permits the associated gas rail 40 to be vertically adjusted to any position on the pole 35.

Figure 7:
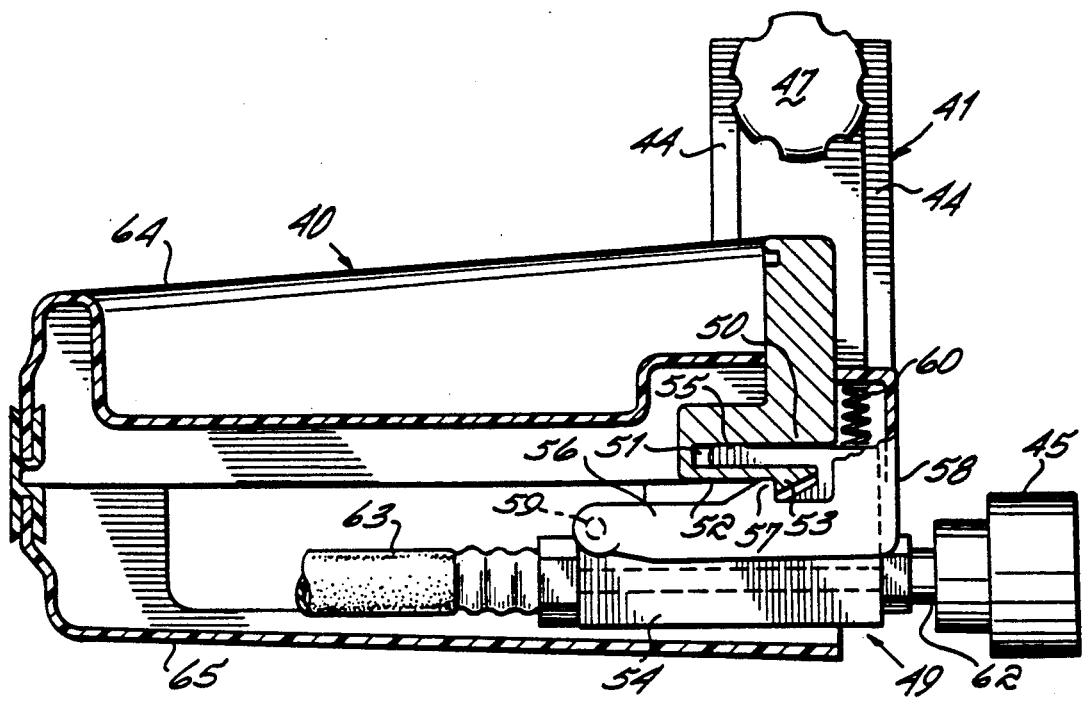
FIG. 7 is a cross-sectional view of the gas rail taken along lines 7—7 of FIG. 6.

As shown in FIGS. 6 and 7, the gas rail 40 is generally of the type disclosed in U.S. Pat. No. 4,646,211 and has a snap-in channel 50 adapted to receive a releasable mounting fixture 49.

The snap-in channel 50 has a horizontal groove 51 defined on the lower side of the groove by a horizontal rib 52. The rib 52 has a downwardly-depending lip 53.

Each fixture 49 is in the form of a block 54 having an upper tongue 55 that is projectable into the groove 51. A plastic fastener 58 is pivotally mounted at 59 to the block 54. The fastener has arms 56 which have upwardly-projecting lugs 57 that snap in behind the downwardly-depending lip 53 and hold the block in position with the tongue 55 in the groove 51. A pair of compression springs 60 urge the arms upwardly to hold the lug 57 in position behind the rib.

The mounting fixture 49 is suitable for mounting accessories 61 such as a drainage bottle or a vaporizing bottle. Each gas rail 40 is about 18" long and the fixture 49 can be mounted at any position along the rail, thereby avoiding interference among various items of equipment.

Figure 10:
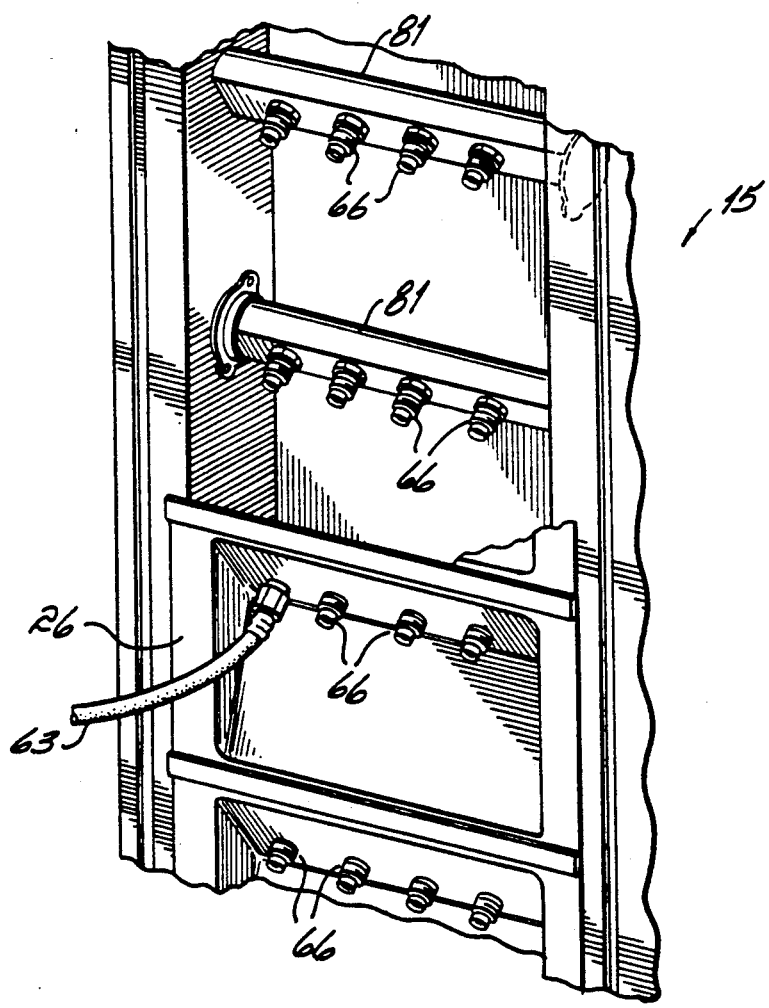
FIG. 10 is a fragmentary perspective view of the back of the power column showing the gas hookups.

Gas outlets 45 are also removably mounted on the rails by fixtures 49. When the fixture 49 is employed as a gas outlet, it has a bore extending through it. At one end of the bore is a nipple 62 which is threaded to receive a gas outlet 45 that is threaded to it. The other side of the bore has a threaded nipple that receives the end of a hose 63. Each outlet 45 is connected by the hose 63 to a hook-up outlet 66 projecting through a triangular recess in the back wall 26 of the power column 15 (FIG. 10). The hose 63 preferably lies in a housing 64 attached to the gas rail. The housing has a hinged lid 65 permitting access to the hoses 63.

Four type of gases are available, namely, oxygen, purified air, vacuum, and nitrous oxide. Those gases are supplied through four tubes 71, 72, 73 and 74 (FIG. 5). Tubes 71 and 72 form part of an integral vertical extrusion 75 on one side of the power column and tubes 73 and 74 form part of an integral extrusion 76 on the other side of the power column. The two extrusions 75, 76 extend vertically down the respective side walls 24 and 25 within the interior of the power column. Each extrusion has a vertical rib 78. Spaced down the length of each extrusion are alternating bores 79 and 80 extending through the rib 78 into respective tubes 73 and 74. Each bore 79, 80 is connected to a respective horizontal manifold bar 81 having four hook-up outlets 66 projecting from it. The bar 81 is cantilevered from its respective extrusion 76 and is capped at its free end 82. The hook-up outlets 66 project through the back wall 26 as shown in FIG. 10 so as to be easily accessible for connection to a hose 63 leading to the gas outlet 45.

There are, uniformly-spaced down the power column, seven manifold bars 81 each delivering the one gas to which it is connected. As stated above, the first three bars are connected to oxygen, pure air and vacuum. The same is true for the bottom three bars. The middle bar is connected to nitrous oxide.

From the foregoing, it can be seen that the nurse can mount one or more gas rails 40 vertically spaced in any position along the vertical rails 38 at either side of the power column. The gas outlet 45 mounted on the gas rail is connected to the desired hook-up port 66 through the flexible hose 63. Preferably, the outlets 45 are color-coded. The vertical position of the gas rail 40 can be adjusted and the gas rails can be pivoted closer to or farther away from the nurse working alongside the bed 20.

Within the power column 15 are four vertical raceways for electrical circuits or conductors (FIG. 5). Two triangular raceways 90 and 91 carry electrical conductors. The conductors in raceway 90 are connected to normal 110 volt power while raceway 91 carries conductors connected to emergency power. Raceways 92 and 93 carry low voltage communication circuits and low voltage monitoring circuits or other electrical type, respectively.

The walls 22 and 23 partly enclose housings 95 and 96, respectively. The outlets 27–29 mounted on the walls 22, 23 project into those housings. Knockouts 97 on the triangular raceways 90, 91 and knockouts 98 on the housings 95, 96 permit conductors 100 from the normal voltage and the emergency power to cross over to the remote housings 95, 96 but are directly connected to the outlets in the adjacent housings through knockouts 98. A third raceway 101 having the crossover conductors 100 is formed by a sheet metal wall 102 which is secured by screws to the back walls of housing 95, 96. The wall 102 separates the gas hook-up ports 66 from the electrical conductors 100 for safety reasons. Thus it is that substantially identical connections can be made to the outlets on both walls 22, 23 so that regardless of the left or right position of the power column, the nurse will have access to substantially the same electrical power outlets.

All of the walls forming the outside walls of the power column 15 and the internal housing and raceway walls are formed of the extrusions depicted in FIG. 5. Certain of the extrusions are interconnected by a ⅛" wire 110 threaded down a hole formed by adjoining grooves in two wall elements to be joined together. Other wall elements are joined by screws as, for example, in the positions 111.

Another useful feature of the invention consists of the mounting of an electronics module 115 (FIGS. 1, 3 and 4) on the front of the power column about 4 ½ feet off the floor. It provides a location for the critical controls, i.e., stat clock, code blue switch, nurse call, etc. With the power column in any position, the nurse is able to reach these critical controls from either side of the bed.

Figure 8:
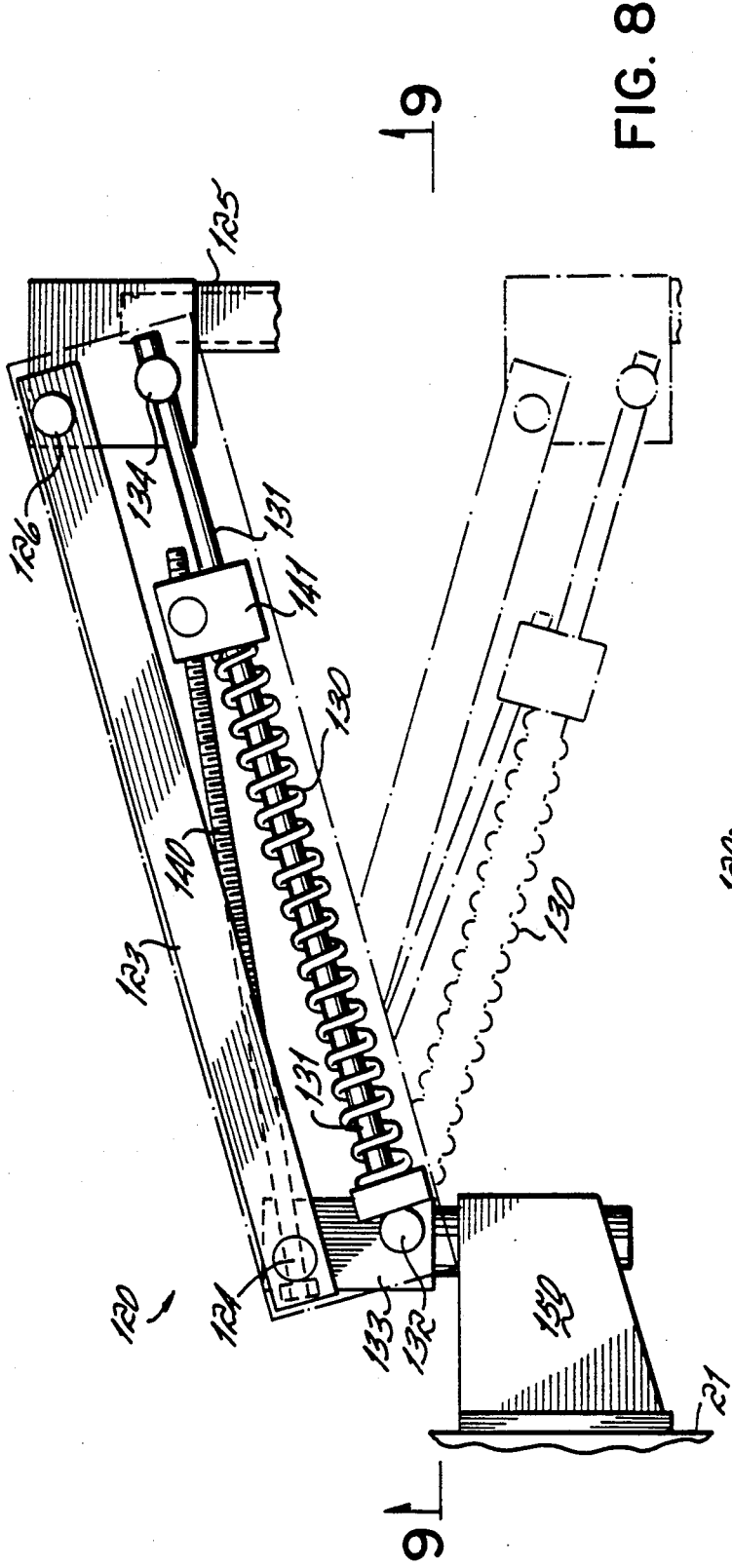
FIG. 8 is an elevational view of a monitor mount.
Figure 9:
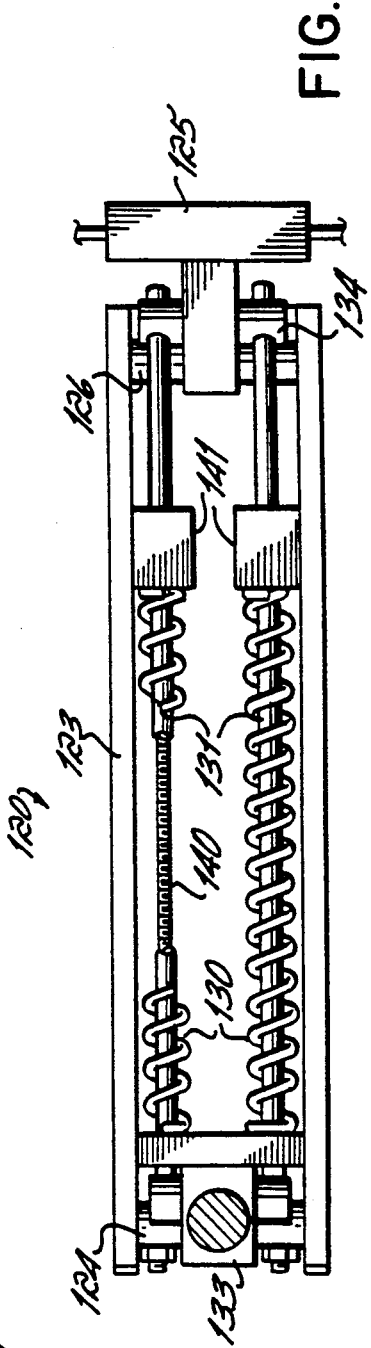
FIG. 9 is a cross-sectional view taken along lines 9—9 of FIG. 8.

A final feature of the invention consists of a mounting 120 of a monitor 121 (FIG. 1) so that it is easily viewed by the attending nurse and is easily moved to the position most desired by the attending nurse. The monitor 121, which may weigh something of the order of 60 lbs., is supported on an arm 123 (FIGS. 8 and 9) obtained from Fohrsight Co. of Clacamus, Oreg. The arm 123 is pivoted at 124 on a horizontal axis for swinging up and down through an angle of about 15°. The monitor 121 is carried by a bracket 125 which is pivoted at 126 on a horizontal axis on the other end of the arm 123.

Counterbalancing compression springs or other means 130 are mounted on rods 131 pivoted at 132 to the post 133 at one end and at 134 to the bracket at the other end. The rods 131 and arms 123 form a four-bar parallelogram linkage which permits the bracket 125 and the monitor which it carries to be raised and lowered. A screw 140 is connected at one end to the pivot 124 and at the other end to a block against which the end of the compression springs bear. The screw 190 is threaded into the block and can be rotated to change the amount of compression on the springs 130. The compression springs counterbalance the weight of the bracket and monitor 121.

The post 133 is pivotally mounted in a bracket 150 which permits the monitor 121 and arm 123 to swing through an angle of about 220° as shown in FIG. 2, thereby permitting the monitor to be swung to either side of the power column 15.

The monitor itself can swivel on the vertical post 125 to permit optimal viewing by the attendant.

In the operation of the invention, the power column will be positioned either in the L position or in the R position at the left or right corners of the bed 20. Usually the positioning will depend upon the condition of the patient and the location of the instruments that must be connected to the patient. However, in some instances it is positioned in accordance with the convenience of the attending nurse.

Electrical instruments may easily be connected to the electrical outlets on the walls 22 or 23 because the particular wall is directly facing the nurse.

The necessary connections are made to the gas outlets from the hook-ups on the back of the power column. The gas rails may be raised and lowered and they may be pivoted toward and away from the attending nurse as desired. Accessories such as bottles may be mounted on the gas rails and slid from left to right for proper spacing with respect to each other as well as proper spacing with respect to the gas outlets.

Once the power column gas outlets and the like have been properly positioned, the monitor will also be set for the most direct viewing by the attending nurse as she administers to the patient.

From the above disclosure of the general principles of the present invention and the preceding detailed description of a preferred embodiment, those skilled in the art will readily comprehend the various modifications to which the present invention is susceptible. Therefore, I desire to be limited only by the scope of the following claims and equivalents thereof:

I claim:

1. A power column adapted to swing from one side of a hospital bed around its end to the other side of said bed, said power column comprising:
    upper and lower arms adapted for pivotal mounting to a ceiling and a floor respectively along a single pivot axis, a hollow, vertical housing having six vertical walls mounted between said arms, said vertical walls including a front wall having two vertical edges, an outlet wall extending from each vertical edge of said front wall at an angle of about 45° to the plane of said front wall, opposed side walls connected to said outlet walls, a back wall connected to said side walls, and a plurality of electrical outlets on said outlet walls, whereby, when said column is swung to either side of said bed, an outlet wall will be disposed substantially perpendicular to the side of the bed at the corner of the bed, facing an attending nurse positioned at the side of the bed and thus optimally accessible to the attending nurse.

2. A power column as in claim 1 further comprising:

means on each side wall for pivotally mounting at least one laterally-projecting gas rail, at least one gas outlet mounted on said gas rail, and a flexible hose connected to said gas outlet whereby said gas rail can be pivoted with respect to said power column to permit optimal positioning of gas outlets.

3. A power column as in claim 2 further comprising:

means for adjusting the height of said gas rail with respect to said power column.

4. A power column as in claim 1 further comprising:

at least one vertical rail on each side wall, and at least one accessory mounted on said vertical rail.

5. A power column as in claim 1 further comprising:

vertical interior walls forming with each outlet wall two vertical housings within said power column for each outlet wall;

and means forming four vertical raceways between said vertical housing for the following categories of electrical connections:

110 volt supply emergency power low voltage conductors low voltage communication systems.

6. A power column as in claim 5 further comprising a plurality of vertical gas supply tubes mounted between said vertical housings and said back wall, a plurality of hook-up outlets connected to said tubes and projecting through said back wall.

7. A hollow power column comprising:

a plurality of vertical walls interconnected to form a power column, vertical rails on at least one wall of said power column, a plurality of horizontal gas rails, means pivotally and vertically slidably mounting said gas rails on said vertical rails, a plurality of vertical gas supply tubes in said power column, at least one gas outlet mounted on said gas rail, and means connecting said outlet to one of said vertical gas supply tubes.

8. A power column as in claim 7 in which two gas supply tubes on each side of said power column are combined as a single extrusion having two tubes side-by-side, a common vertical rib joining said tubes and forming an integral part of said extrusion, a plurality of vertically-spaced bores through said boss alternatingly-connected to each said tube, and horizontal tubes connected to each said bore, each said horizontal tube having at least one gas hook-up outlet.

9. A power column as in claim 8 further comprising a plurality of hook-up outlets mounted on each horizontal tube and projecting through a wall of said power column.

10. A power column as in claim 9 in which said gas rail mounting means comprises:

a vertical post mounted on each side of said power column, a vertical channel rotatably mounted on said post and forming said vertical rail, each said gas rail having, at one end, a fitting mating with said channel and being vertically slidable thereon, and means for clamping said fitting in any suitable place on said post.

11. A power column as in claim 9 further comprising:

means for swinging said power column around the end of a bed, a monitor, an arm projecting generally horizontally from said power column, means mounting said arm on said power column to swing horizontally through an arc of at least about 180° and to swing through a vertical arc of about 15°, means mounting said monitor on the free end of said arm to swivel about a vertical axis and to tilt up and down about a horizontal axis, whereby said monitor is optimally visible regardless of the side of a bed that said power column is swung to.

* * * * *

UNITED STATES PATENT AND TRADEMARK OFFICE
CERTIFICATE OF CORRECTION

PATENT NO. : 5,186,337
DATED : February 16, 1993
INVENTOR(S) : L. Dale Foster and Timothy A. Kappers It is certified that error appears in the above-identified patent and that said Letters Patent is hereby corrected as shown below:

Column 6, line 14, after "bracket", insert -- 125 --.

Column 6, line 21, after "block", insert -- 141 --.

Column 6, line 22, after "springs", insert --130 --.

Signed and Sealed this

Twenty-ninth Day of March, 1994

Attest:

BRUCE LEHMAN

Attesting Officer

Commissioner of Patents and Trademarks